United States Patent

[11] 3,548,981

| [72] | Inventors | Rodney G. Hill<br>Faversham, Kent;<br>Peter O. Koenig, Ditton, Kent, England |
|---|---|---|
| [21] | Appl. No. | 801,955 |
| [22] | Filed | Feb. 25, 1969 |
| [45] | Patented | Dec. 22, 1970 |
| [73] | Assignee | Twin Disc, Incorporated<br>Racine, Wis.<br>a corporation of Wisconsin |

[54] POWER SHIFT TRANSMISSION HAVING SYNCHRONIZED CLUTCH CONTROL
1 Claim, 12 Drawing Figs.

| [52] | U.S. Cl. | 192/3.57, 192/83, 192/91 |
|---|---|---|
| [51] | Int. Cl. | F16d 67/00 |
| [50] | Field of Search | 192/3.5FR, 3.5FRE |

[56] References Cited
UNITED STATES PATENTS

| 2,137,939 | 11/1938 | Eaton | 192/3.5FR |
| 2,664,980 | 1/1954 | Weaving et al. | 192/3.5FR |
| 2,955,691 | 10/1960 | Brueder | 192/3.5FR |
| 2,974,766 | 3/1961 | Perkins et al. | 192/3.5FR |
| 3,292,751 | 12/1966 | McRay et al. | 192/3.5FR |
| 3,459,285 | 8/1969 | Lamburn et al. | 192/3.5FR |

*Primary Examiner*—Benjamin W. Wyche
*Attorney*—James E. Nilles

ABSTRACT: A power shift transmission including a plurality of selectively operated, hydraulically actuated friction clutches for obtaining different speed ratios in a change gear mechanism. The transmission includes a master clutch driven from the power source, and which clutch is momentarily released during engagement of the speed selection clutches. The same pressure fluid which is used to engage the speed selection clutches is also used to momentarily release the main clutch by means of a hydraulic cylinder means.

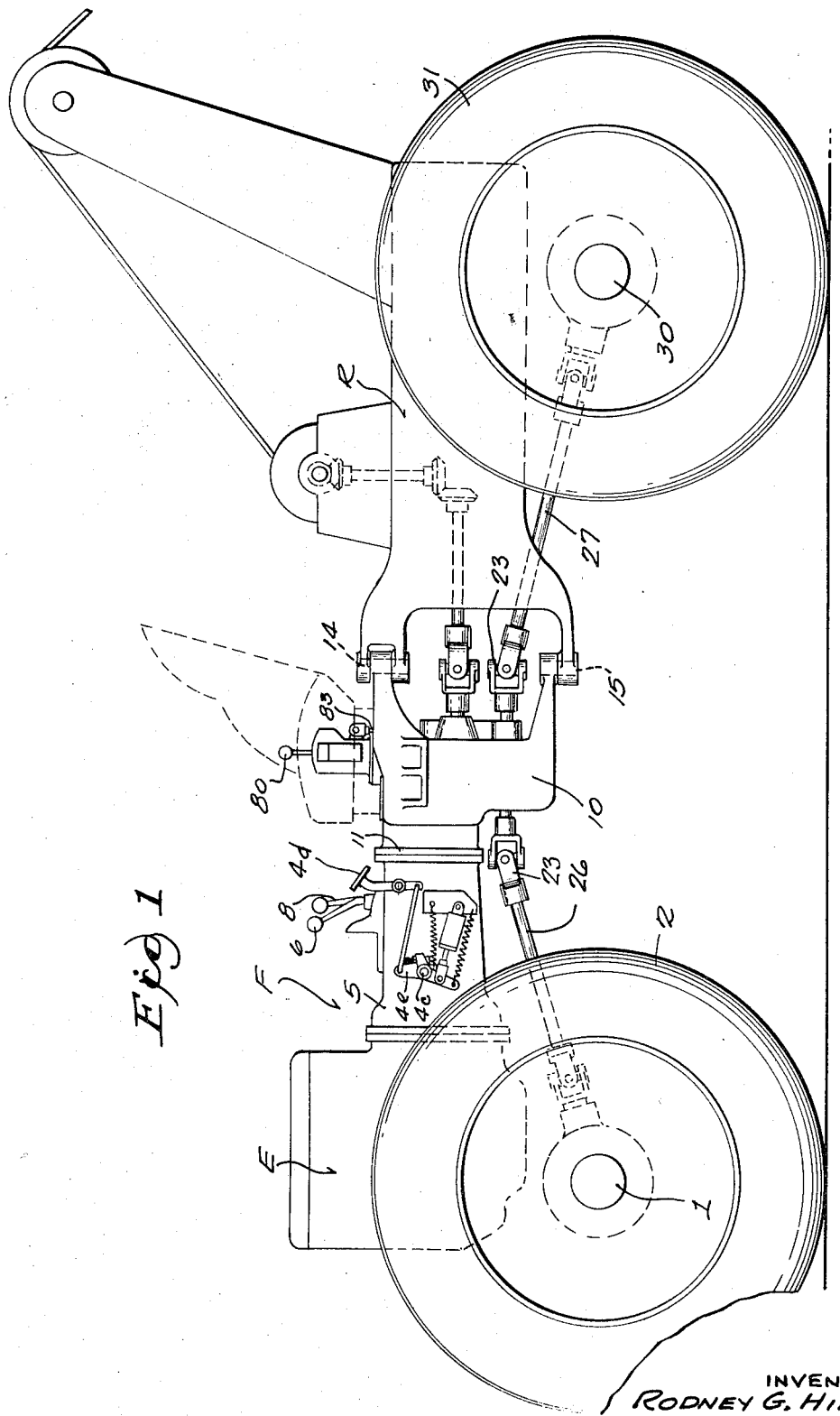

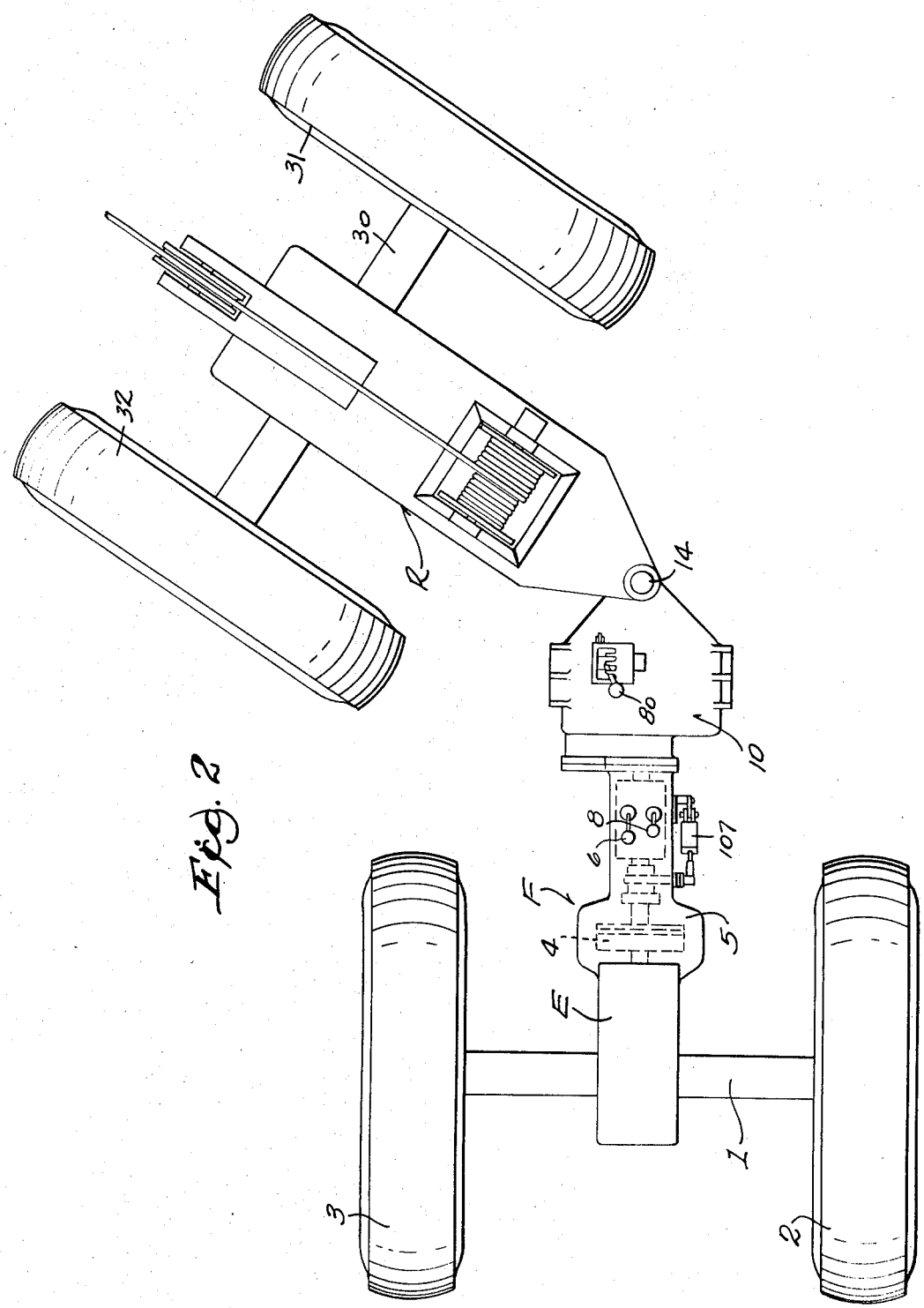

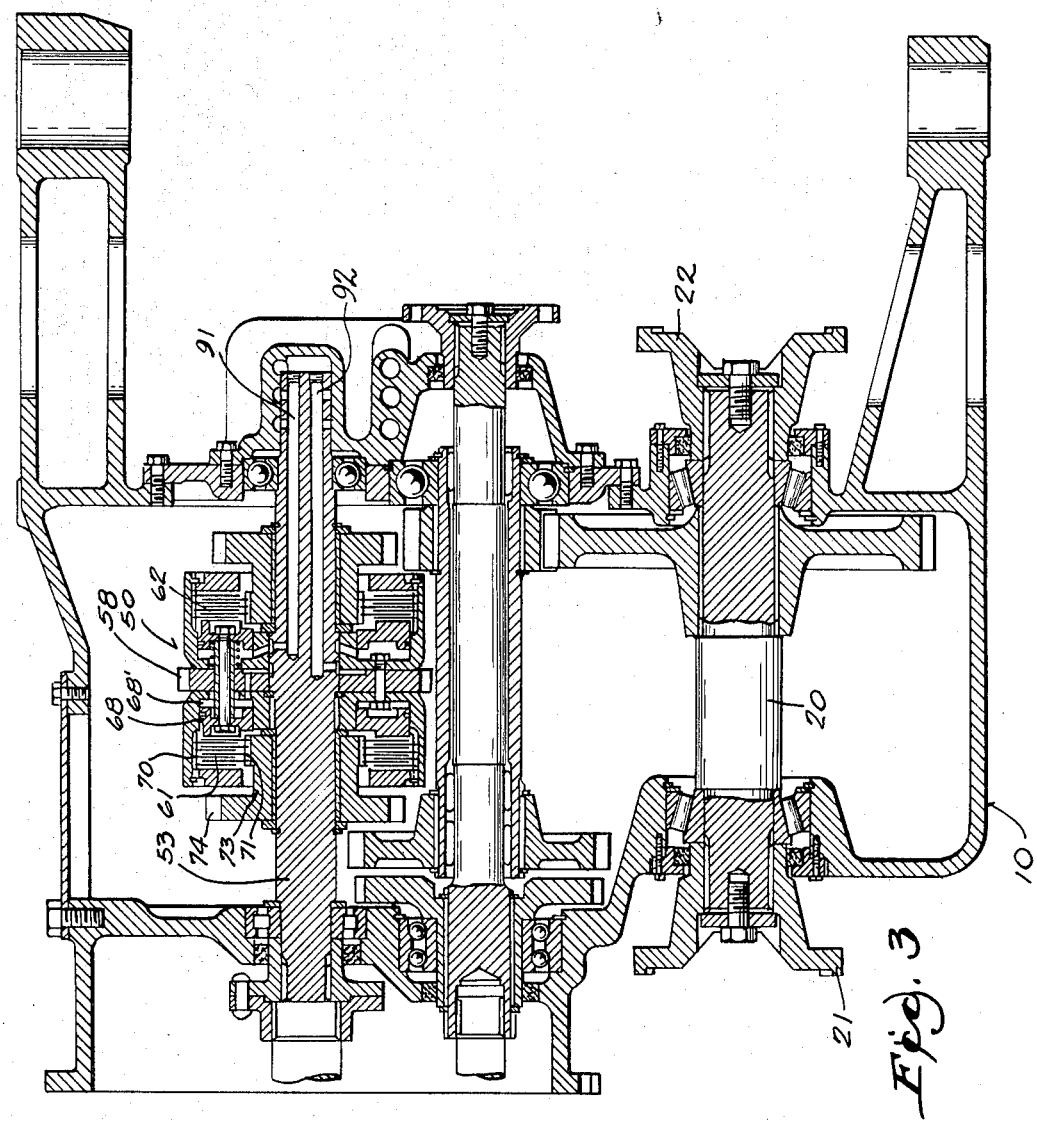

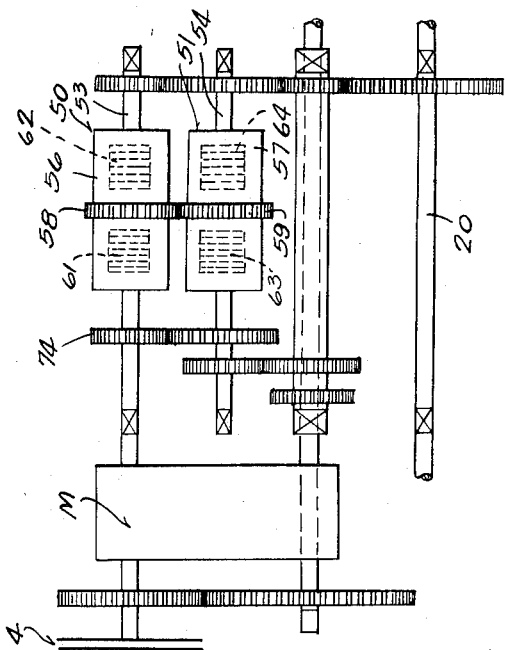
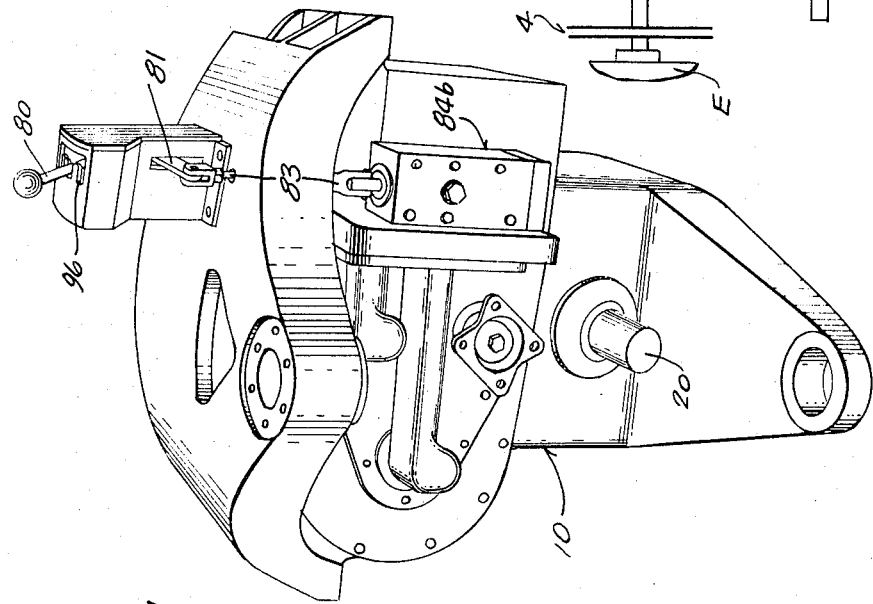

INVENTORS:
RODNEY G. HILL
PETER O. KOENIG

BY: James E. Nilles
ATTORNEY

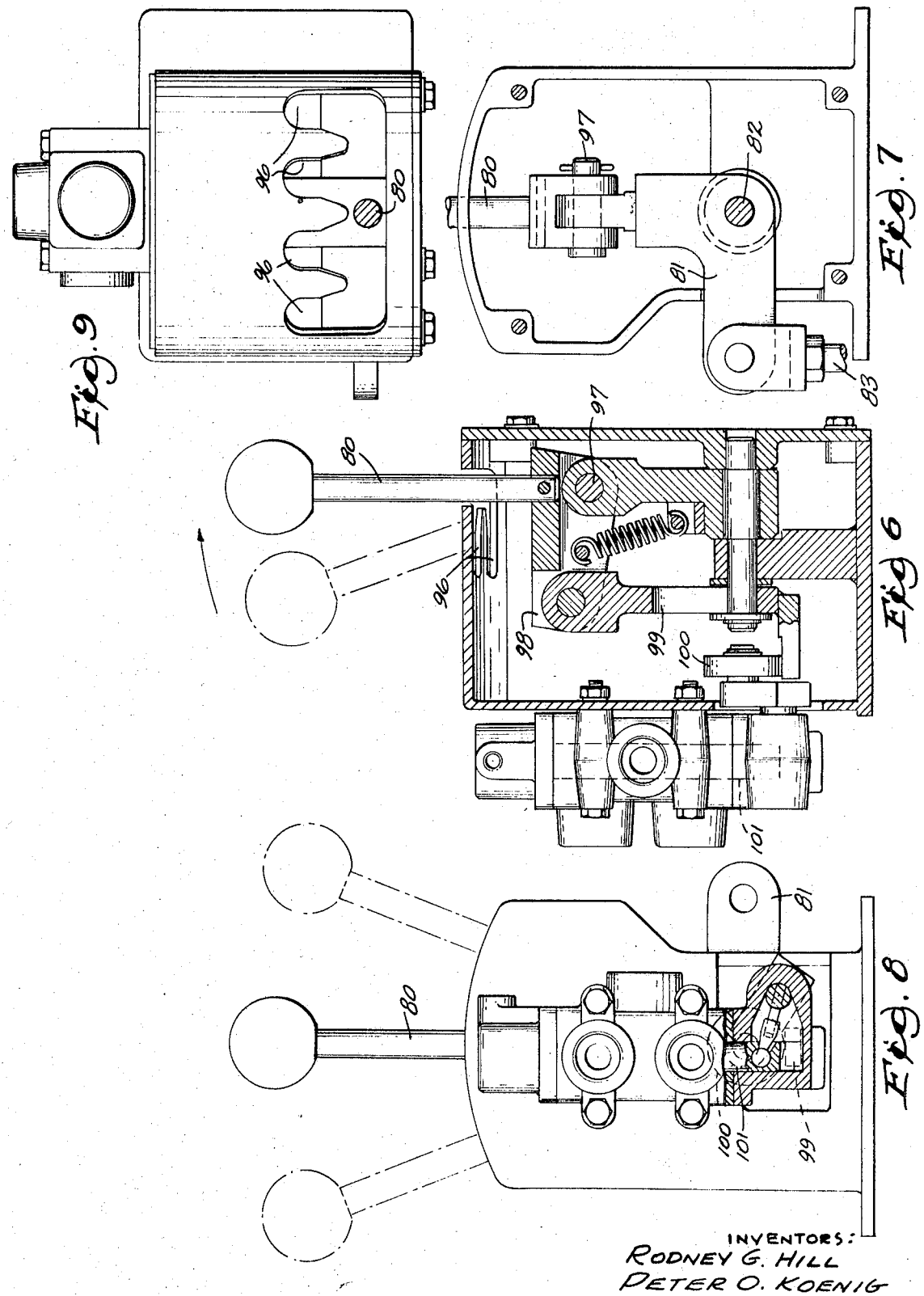

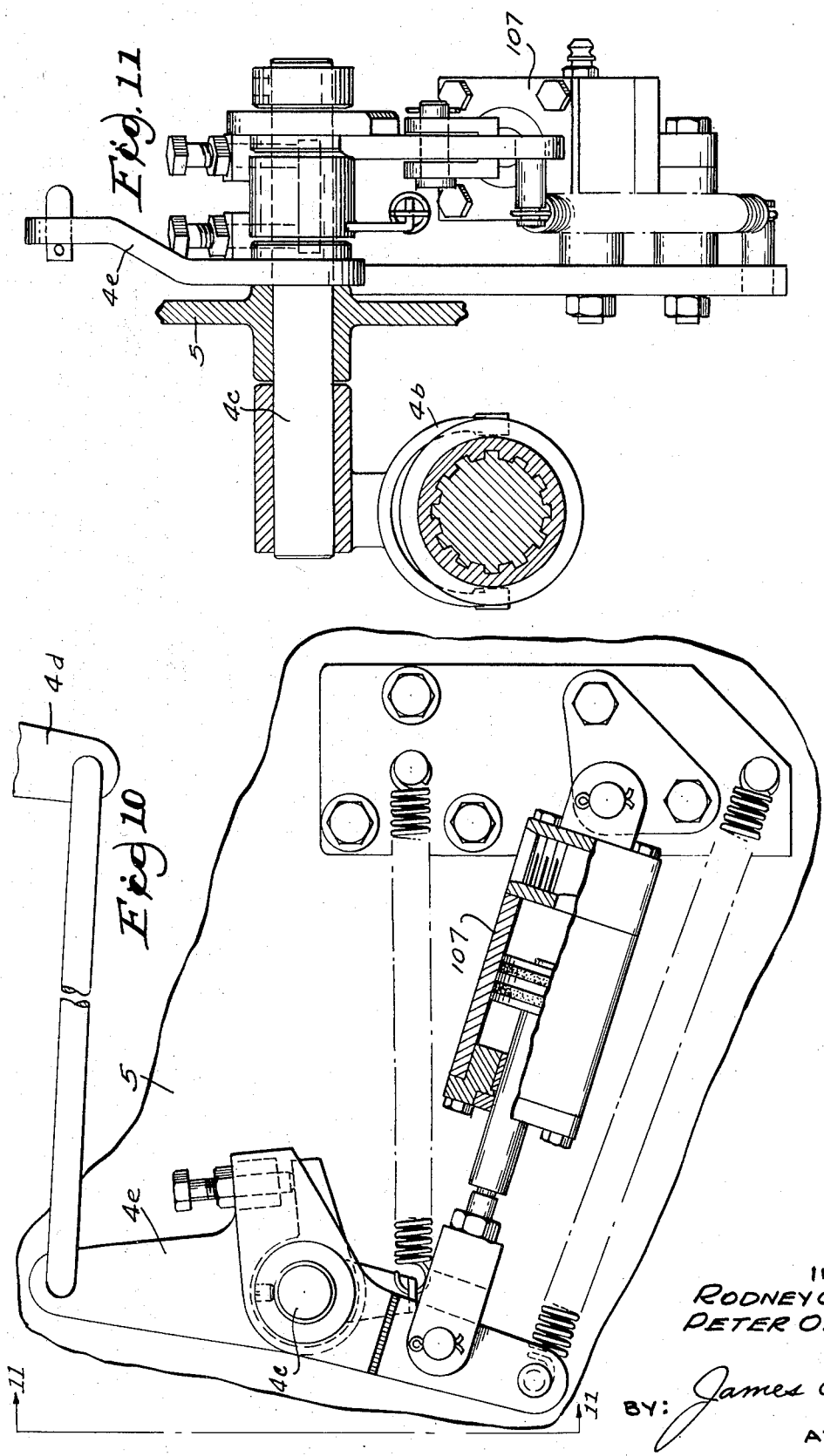

3,548,981

POWER SHIFT TRANSMISSION HAVING SYNCHRONIZED CLUTCH CONTROL

BACKGROUND OF THE INVENTION

The invention pertains to power shift transmissions of the type utilizing hydraulically actuated friction clutches for the selection of the desired speed ratio in a change speed gearset. These transmissions have a master clutch between the power source and the change speed gearset. To shift these change speed clutches under load places a considerable load on the clutches, particularly in industrial vehicles, results in the necessity to frequently repair and replace these clutches. Prior art attempts have been made to control the master clutch just prior to or during engagement of the speed selection clutches. These prior devices, however, have had several shortcomings, such as being complicated in structure and also difficult for the operator to manipulate.

SUMMARY OF THE INVENTION

The present invention generally provides a power transmission having a plurality of hydraulically actuated friction clutches which are selectively engaged by the operator to thereby select the desired gear ratio in a change speed gearset, and which transmission has a master clutch between the power source and the power shift change speed gear mechanism. The master clutch is normally biased to the engaged position by spring means. More specifically, the invention provides a fluid-pressure control which momentarily releases the master clutch during engagement of the power shift clutches. The control apparatus is such that when the operator swings the gear shift lever to select the desired gear ratio by engaging the desired speed selection clutch, the same lever is also used to actuate a master clutch release cylinder, the same pressure fluid system being used to operate the speed selection clutches and the master clutch release cylinder.

BRIEF DESCRIPTION OF THE DRAWINGS

FIG. 1 is a longitudinal, elevational view and more or less schematic in nature, of a vehicle embodying the present invention;

FIG. 2 is a plan view of the vehicle shown in FIG. 1, but showing the front and rear sections of the vehicle moved to a different position relative to one another;

FIG. 3 is an enlarged, cross-sectional, elevational view of a portion of a vehicle, namely the gear box shown in FIG. 1;

FIG. 3a is a schematic, spread-out view of the power gearshift arrangement of FIG. 3;

FIG. 4 is a perspective view of the rear end of the power shift box;

FIG. 6 is an enlarged cross-sectional view through the control lever mechanism used for selecting the desired speed clutch and for causing momentary release of the master clutch;

FIG. 7 is a side elevational view of the control apparatus shown in FIG. 6, with the cover plate moved for clarity;

FIG. 8 is a side elevational view partially in section of the FIG. 6 apparatus;

FIG. 9 is a plan view partially in section of the apparatus;

FIG. 10 is a side elevational view, partially in section and on an enlarged scale of the master clutch release cylinder; and FIG. 11 is a view taken along line 11-11 in FIG. 10.

DESCRIPTION OF A PREFERRED EMBODIMENT

Figure 5:
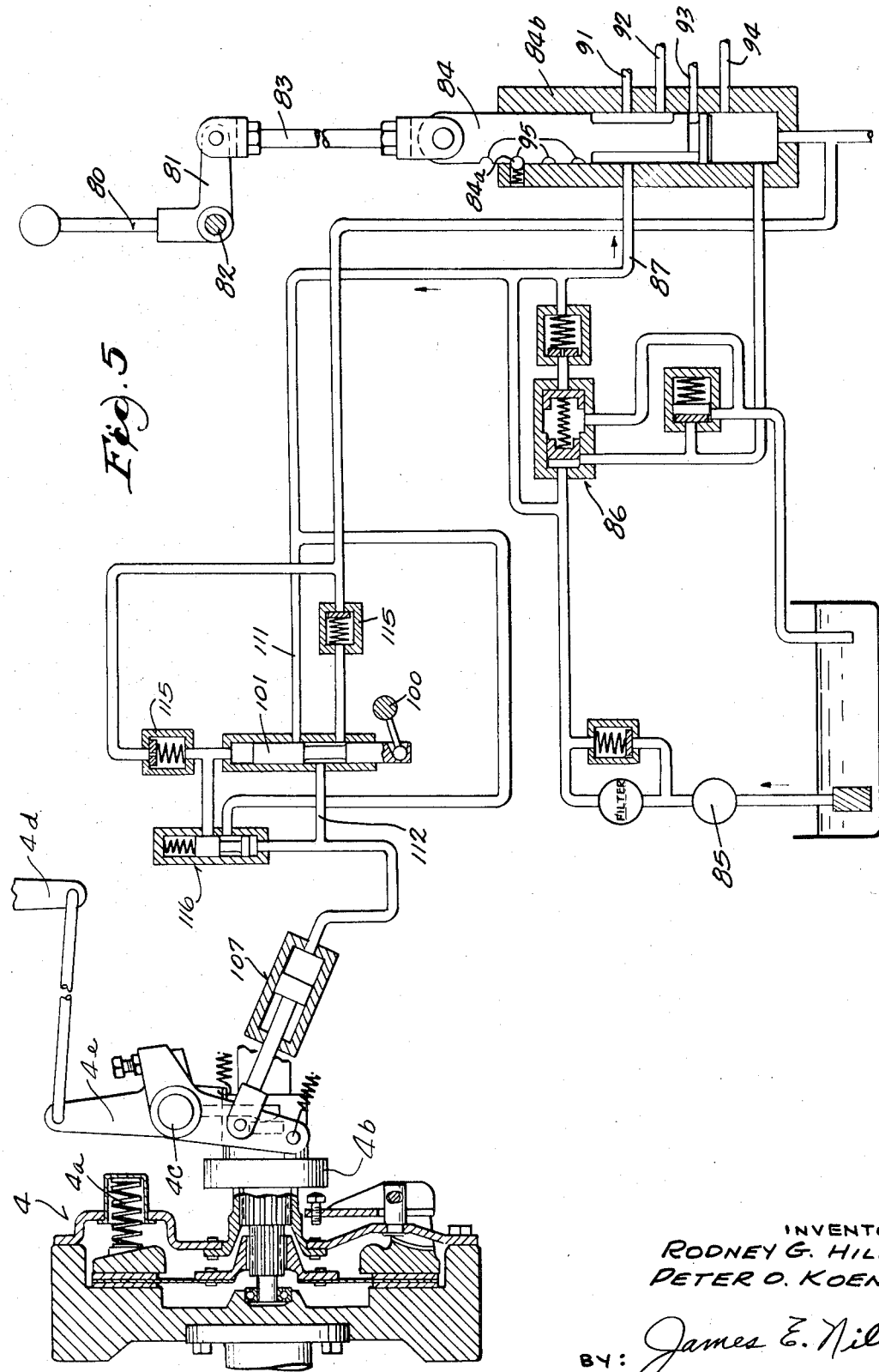
FIG. 5 is a schematic diagram of a hydraulic circuit used on the vehicle.

The invention has been shown as embodied in a log skidder which is used to drag logs out of a logging area by means of a cable extending rearwardly of the log skidder vehicle. It will be appreciated, however, that the invention is applicable to earth-working machines or the like, usually of a heavy industrial character.

The general organization of the vehicle is shown in FIGS. 1 and 2 and includes front section F having a single axle 1 to which the large ground-engaging, drive wheels 2 and 3 are connected. The front section includes the power source, such as an internal combustion engine E which transmits power to the master clutch 4 in the clutch housing 5 (FIGS. 1, 2 and 5). The clutch 4 is of the friction plate type which is normally held in engagement by the spring means 4a (FIG. 5). The clutch is disengaged by the shifting yoke 4b which is actuated by the clutch-actuating shaft 4c which extends outwardly from the clutch housing and from the side of the vehicle. This shaft may be oscillated in the known manner by the operator's foot pedal 4d which is connected to the upper end of the clutch lever 4e fixed to the clutch-actuating shaft 4c. Thus depressing the clutch pedal causes the shaft to rotate, and the shifting yoke then causes the clutch plates to be separated, releasing the normally engaged clutch.

The clutch may also be disengaged momentarily, by hydraulic control means to be described, when a power shift of the speed change clutches is to be made.

Within the clutch housing is also located conventional mechanism M (FIG. 2) for selecting either a high or low range of speed, which selection is made by the control lever 6, and for reversing the direction of the vehicle, and this is accomplished by the control lever 8, in the known manner.

Power is delivered from the clutch housing mechanism and rearwardly to the power shift mechanism to be described, located within the power shift box 10. The power shift box is a large, heavy steel casting which is mounted at its front flange 11 to the rear end of the clutch housing 5. The rear end of the power shift box 10 forms a vertical pivot axis with the rear section R.

Journaled within the power shift box and adjacent the lower portion thereof is an output shaft 20 which extends both forwardly and rearwardly from the box and has a yoke connection 21 and 22 fixed to the front and rear ends thereof, respectively. Universal joints 23 connect the yokes 21 and 22, by means of the drive shafts 26 and 27 to the front axle 1 and rear axle 30 respectively of the vehicle. Thus power is transmitted from the engine to both the front and rear axles.

The rear section R of the vehicle is supported by the ground-engaging, driven wheels 31 and 32 which are conventionally attached to the rear axle 30. The front end of the rear section R is of bifurcated construction and is pivotally connected to the front section by the pivot pins 14 and 15.

In this manner, the vehicle has an articulated frame consisting of the front section F and the rear section R pivotally connected together about a vertical axis.

Referring to FIGS. 3 and 3a, the power shift box 10 contains a pair of hydraulically actuated, duplex clutches 50 and 51, each connected to its respective shaft 53 and 54. These shafts 53 and 54 located generally in side-by-side relationship and the annular housings 56 and 57 of the duplex clutches are in constant mesh with each other by means of their central gears 58, 59, rigidly fixed thereto.

The duplex clutches 50 and 51 each comprise, respectively, a pair of friction plate-type clutches 61, 62 and 63, 64. As the construction of these clutches is similar, only one will be described, particularly in view of the fact that the duplex clutches themselves are of conventional nature.

The clutches are of the hydraulically actuated type each having a piston 68 slidable within the annular housing, and pressurization of the fluid actuating chamber 68' causes extension of the piston to thereby urge the interleaved clutch plates 70, 71 which are splined to the annular housing and a hub member 73, respectively, to clamp up in engagement. A gear 74 is formed with the hub 73, the hub and gear being rotatably mounted on their respective shaft. In this manner, pressurization of the clutch causes clutch clamp up and driving rotation of its associated gear.

With the four clutches as shown, four speeds are provided, as will appear, for this power shift transmission. Reversal of these speeds is accomplished as previously mentioned by the reversing lever 8 in the clutch transmission housing.

The four speeds for the vehicle obtainable with the above mentioned clutches are obtained when the operator shifts the power shift lever 80 to any one of four positions. Swinging movement of this lever causes pivoting of the bellcrank 81 about pivot 82 and consequent vertical shifting of link 83 connected to the valve spool 84. As shown in the schematic diagram of FIG. 5, shifting of the valve spool admits fluid pressure from a source of pressure fluid, such as pump 85, against the action of a clutch pressure regulator valve 86, and through a pressure fluid supply line 87, and then to either one of the selected conduits 91, 92, 93 or 94 leading respectively to clutches 61, 62, 63 or 64.

More specifically, as shown in FIG. 5, four detents 95 are formed in the valve spool 84 and the spring-loaded plunger 84a in the valve housing 84b holds the spool in any one of four positions corresponding to the position of lever 80 in the four notches 96 of the control apparatus to be referred to.

Referring to FIG. 6, when the operator desires to shift speeds, he first swings the lever 80 in the direction indicated by the curvilinear arrow, namely, swings the lever out of one of the four notches 96. This initial swinging about pin 97 lifts the outer end of link 98 which is rigidly fastened to lever 80, thus raising the L-shaped cam arm 99. Vertical movement (as viewed in the drawings), of the cam arm 99 causes rotation of the cam 100, which in turn causes actuation of a three-way, cam-operated, directional control valve spool 101.

When the spool valve 101 is caused to move into the open position by the rotation of cam 100 as when lever 80 is initially swung as indicated in FIG. 6, the spool is momentarily depressed, as viewed in FIG. 5, thereby permitting pressure fluid to flow from the pump 85 and conduit 111, and through conduit 112. This momentary flow causes the cylinder 107 to extend, thus momentarily releasing the clutch. In this manner, the clutch is very briefly released immediately prior to the actual shifting of the gears.

After this momentary release, the clutch is returned immediately to its engaged position due to the action of its springs 4a which normally bias the clutch to the engaged position.

The control valve spool returns to its closed position each time the control lever 80 is moved back into any of the notches 96. The disengagement of the master clutch is controlled simply by the above-mentioned sideways movement of the lever 80 which causes the control valve spool 101 to move into either the open or closed position. Regardless of which of the four notches the control valve lever moves in, the effect on the control valve spool 101 is the same.

Thus, the detents 95 in the main power shift control valve 84, hold the transmission in the particular gear desired. During a rotational movement of the gear lever 80, crank 81 actuates a rod or cable which lifts or lowers spool 84.

In summary, rotational movement of the control lever 80 selects gear ranges, the position of the gear lever is controlled by detents 95 arranged between the control valve spool 84 and the control valve housing 84b. The side-to-side movement of the control lever 80 moves control valve spool 101 into either the open or closed position. This valve in turn either supplies or cuts off oil to the master clutch release cylinder 107. The control valve lever 80 is biased into the "in the notch position" which means that the master clutch is engaged. It is possible to change more than one range without reengaging and the disengaging the master clutch, however, the notches 96 could be arranged such that gear changes of more than one range at a time cannot be accomplished.

Suitable one-way restricted flow valves 115 are provided as indicated and a conventional pressure relief valve 126 is also in the hydraulic circuit.

We claim:

1. A power-shift transmission having a source of power, a master clutch normally biased to a clutch-engaged position and drive by said source of power, a clutch-actuating shaft for disengaging said master clutch, a clutch lever fixed to said shaft, a solid link connected adjacent one end of said lever, a manually operated clutch pedal connected directly to said link for operating said actuating shaft only through said lever and link to disengage said master clutch, a hydraulic cylinder connected to said lever of said actuating shaft at a location separate from said link for disengaging said master clutch independently of said pedal, change speed gear mechanism including a plurality of hydraulically actuated friction clutches for selective engagement of gears in said mechanism to provide various speed ratios, fluid pressure control mechanism including a shiftable control lever for selectively actuating said friction clutches, said hydraulic cylinder and said hydraulically actuated friction clutches being in a common fluid control circuit, a speed selector valve in said circuit and for directing pressure fluid selectively to said hydraulically actuated friction clutches, said selector valve being shifted by said lever, a valve having a shiftable element for directing pressure fluid to said hydraulic cylinder for causing actuation of said shaft and consequent master clutch disengagement, and means connected to said lever and for shifting said element when said lever is moved initially to shift said selector valve, whereby said master clutch is momentarily disengaged when a hydraulically actuated clutch is to be engaged.